(12) United States Patent
Tateishi

(10) Patent No.: US 12,085,408 B2
(45) Date of Patent: Sep. 10, 2024

(54) VEHICLE POSITION ESTIMATION DEVICE, VEHICLE POSITION ESTIMATION METHOD, AND NON-TRANSITORY RECORDING MEDIUM

(71) Applicant: TOYOTA JIDOSHA KABUSHIKI KAISHA, Toyota (JP)

(72) Inventor: Kojiro Tateishi, Kita-ku (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 315 days.

(21) Appl. No.: 17/691,175

(22) Filed: Mar. 10, 2022

(65) Prior Publication Data

US 2022/0307858 A1 Sep. 29, 2022

(30) Foreign Application Priority Data

Mar. 25, 2021 (JP) .................... 2021-051294

(51) Int. Cl.
*G01C 21/00* (2006.01)
*B60W 60/00* (2020.01)

(52) U.S. Cl.
CPC ......... *G01C 21/387* (2020.08); *B60W 60/001* (2020.02); *G01C 21/3833* (2020.08);
(Continued)

(58) Field of Classification Search
CPC .............. G01C 21/387; G01C 21/3833; G01C 21/3889; G01C 21/3407; G01C 21/3602; B60W 60/001; B60W 2420/403; B60W 2552/53; B60W 2554/4041; B60W 40/00; B60W 10/04; B60W 10/18; B60W 10/20;
(Continued)

(56) References Cited

U.S. PATENT DOCUMENTS

| | | |
|---|---|---|
| 2019/0137281 A1 | 5/2019 | Tateishi |
| 2020/0240806 A1 | 7/2020 | Daikoku et al. |
| 2021/0025981 A1 | 1/2021 | Kato et al. |

FOREIGN PATENT DOCUMENTS

| | | |
|---|---|---|
| JP | 6342104 B1 | 6/2018 |
| JP | 2019-086363 A | 6/2019 |

(Continued)

OTHER PUBLICATIONS

Kang, Jeong Min, et al. "Lane-level map-matching method for vehicle localization using GPS and camera on a high-definition map." Sensors 20.8 (2020): 2166. (Year: 2020).*

*Primary Examiner* — Alan D Hutchinson
(74) *Attorney, Agent, or Firm* — Oliff PLC

(57) ABSTRACT

The vehicle position estimation device includes a processor configured to estimate a vertical position of a vehicle based on an output of a vehicle state detection device, detect actual dividing lines at both left and right sides of the vehicle, compare a dividing line on a map at the vertical position of the vehicle and an actual dividing line and estimate a horizontal position of the vehicle, and determine a driving route of the vehicle. The processor is configured to calculate an amount of change of a horizontal position with respect to the driving route based on a map information for each of dividing lines of both left and right sides of the driving route in a predetermined range, and determine a dividing line on the map for comparison based on the amounts of change.

5 Claims, 8 Drawing Sheets

(52) U.S. Cl.
CPC ... *G01C 21/3889* (2020.08); *B60W 2420/403* (2013.01); *B60W 2552/53* (2020.02); *B60W 2554/4041* (2020.02)

(58) Field of Classification Search
CPC .............. B60W 50/14; B60W 60/00; B60W 2050/143; B60W 2050/146; B60W 2420/408; B60W 2420/54; B60W 2520/10; B60W 2520/14; B60W 2554/00; B60W 2554/80; B60W 2556/40; B60W 2556/50; G06V 20/588
See application file for complete search history.

(56) References Cited

FOREIGN PATENT DOCUMENTS

| | | | |
|---|---|---|---|
| JP | 2019-132762 | A | 8/2019 |
| JP | 2020-026985 | A | 2/2020 |
| WO | 2019/189098 | A1 | 10/2019 |

\* cited by examiner

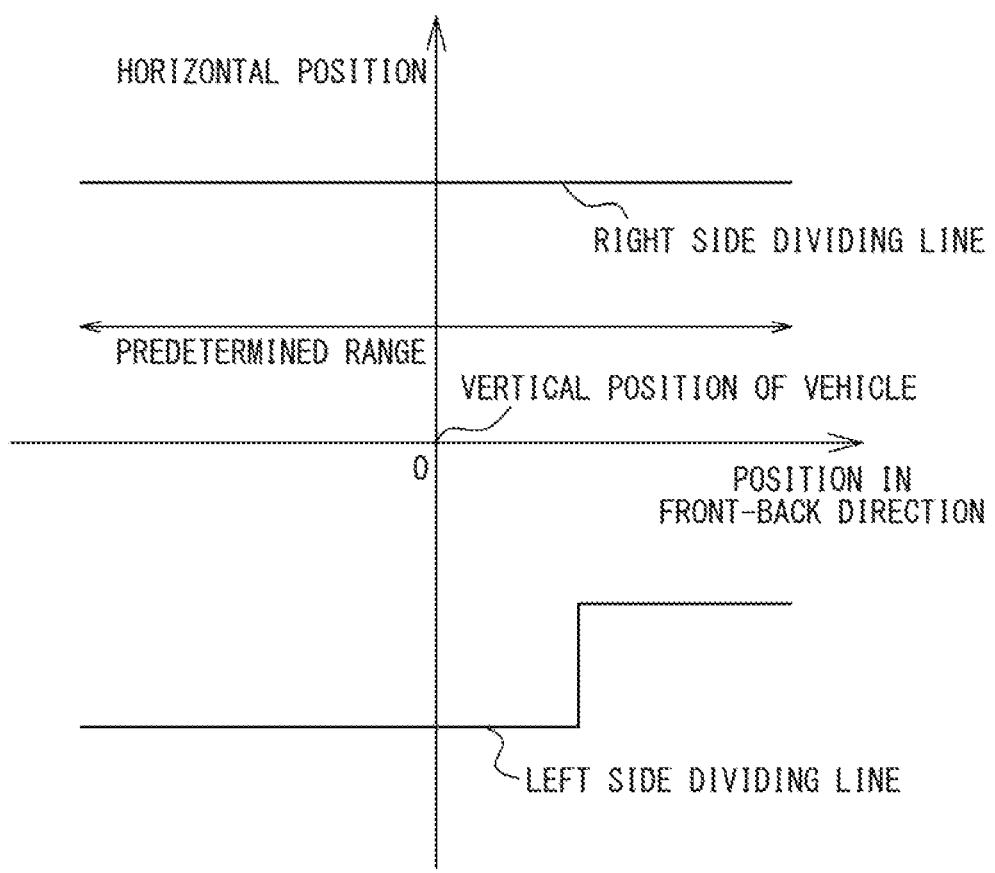

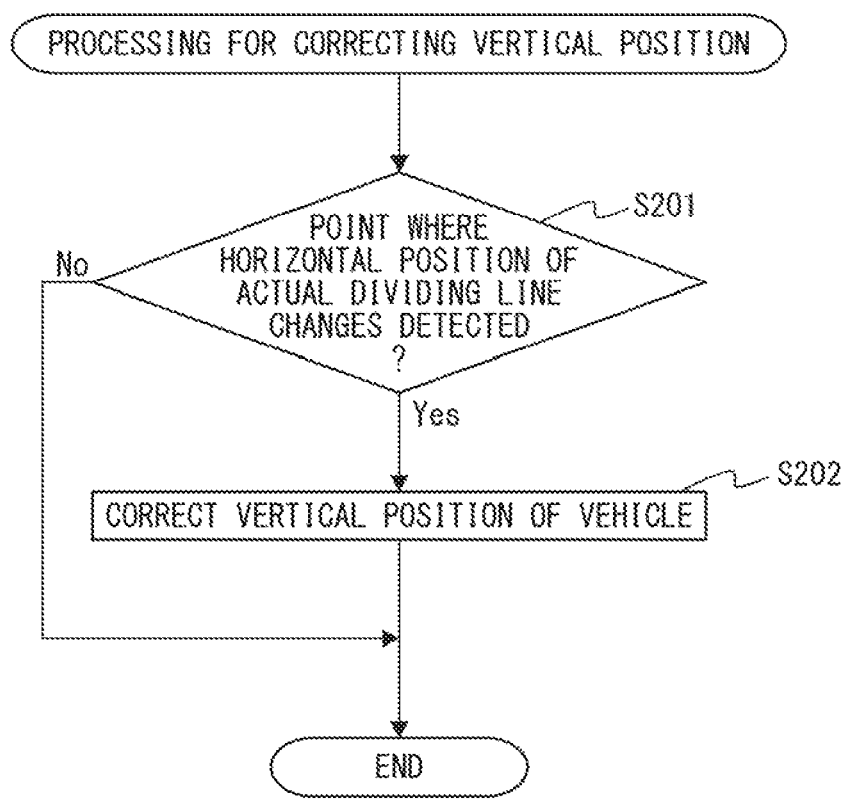

VEHICLE POSITION ESTIMATION DEVICE, VEHICLE POSITION ESTIMATION METHOD, AND NON-TRANSITORY RECORDING MEDIUM

FIELD

The present disclosure relates to a vehicle position estimation device, a vehicle position estimation method, and a non-transitory recording medium.

BACKGROUND

In the past, the art of estimating the home position of a vehicle to make the vehicle run along a desired driving route has been known (for example, PTLs 1 to 4). In the home position estimation device described in PTL 1, the horizontal position of the vehicle is estimated by comparing the left and right dividing lines of a running lane included in a road surface image captured by cameras and the left and right dividing lines of a running lane included in map information.

CITATIONS LIST

Patent Literature

PTL 1: Japanese Unexamined Patent Publication No. 2019-132762
PTL 2: WO2019/189098
PTL 3: Japanese Patent No. 6342104
PTL 4: Japanese Unexamined Patent Publication No. 2020-26985

SUMMARY

Technical Problem

However, if estimation error occurs in a vertical position of a vehicle, dividing lines of a position different from the actual position of the vehicle will be used as the dividing lines on the map being compared with. As a result, the precision of estimation of the horizontal position of the vehicle is liable to fall.

Therefore, considering the above technical problem, an object of the present disclosure is to keep estimation error of a vertical position of a vehicle from causing a drop in the estimation precision of a horizontal position of a vehicle.

Solution to Problem

The summary of the present disclosure is as follows.

(1) A vehicle position estimation device comprising a processor configured to: estimate a vertical position of a vehicle based on an output of a vehicle state detection device detecting a status quantity of the vehicle; detect actual dividing lines at both left and right sides of the vehicle; compare a dividing line on a map at the vertical position of the vehicle and an actual dividing line and estimate a horizontal position of the vehicle based on a relative positional relationship between the actual dividing line and the vehicle; and determine a driving route of the vehicle, wherein the processor is configured to calculate an amount of change of a horizontal position with respect to the driving route based on a map information for each of dividing lines of both left and right sides of the driving route in a predetermined range before and after the vertical position of the vehicle, and determine a dividing line on the map for comparison based on the amounts of change.

(2) The vehicle position estimation device described in above (1), wherein if the amount of change for the dividing line of one side of the driving route is less than a predetermined threshold value and the amount of change for the dividing line of the other side of the driving route is equal to or greater than that threshold value, the processor is configured to use the dividing line at the one side on the map for comparison.

(3) The vehicle position estimation device described in above (1) or (2), wherein if a point where the horizontal position of the actual dividing line with respect to the driving route changes is detected, the processor is configured to correct the vertical position of the vehicle based on a relative positional relationship between the point and the vehicle.

(4) A vehicle position estimation method including: estimating a vertical position of a vehicle based on an output of a vehicle state detection device detecting a status quantity of the vehicle; detecting actual dividing lines at both left and right sides of the vehicle; comparing a dividing line on a map at the vertical position of the vehicle and an actual dividing line and estimating a horizontal position of the vehicle based on a relative positional relationship between the actual dividing line and the vehicle; and determining a driving route of the vehicle, wherein estimating the horizontal position of the vehicle includes calculating an amount of change of a horizontal position with respect to the driving route based on a map information for each of dividing lines of both left and right sides of the driving route in a predetermined range before and after the vertical position of the vehicle, and determining a dividing line on the map for comparison based on the amounts of change.

(5) A non-transitory recording medium having recorded thereon a computer program causing a computer to: estimate a vertical position of a vehicle based on an output of a vehicle state detection device detecting a status quantity of the vehicle; detect actual dividing lines at both left and right sides of the vehicle; compare a dividing line on a map at the vertical position of the vehicle and an actual dividing line and estimate a horizontal position of the vehicle based on a relative positional relationship between the actual dividing line and the vehicle; and determine a driving route of the vehicle, wherein estimating the horizontal position of the vehicle includes calculating an amount of change of a horizontal position with respect to the driving route based on a map information for each of dividing lines of both left and right sides of the driving route in a predetermined range before and after the vertical position of the vehicle, and determining a dividing line on the map for comparison based on the amounts of change.

According to the present disclosure, it is possible to keep estimation error of a vertical position of a vehicle from causing a drop in the estimation precision of a horizontal position of a vehicle.

BRIEF DESCRIPTION OF DRAWINGS

FIG. 8 is a view showing one example of a horizontal position of dividing lines in a predetermined range.

FIG. 9 is a flow chart showing a control routine of processing for estimation of a vertical position in a second embodiment of the present disclosure.

DESCRIPTION OF EMBODIMENTS

Figure 1:
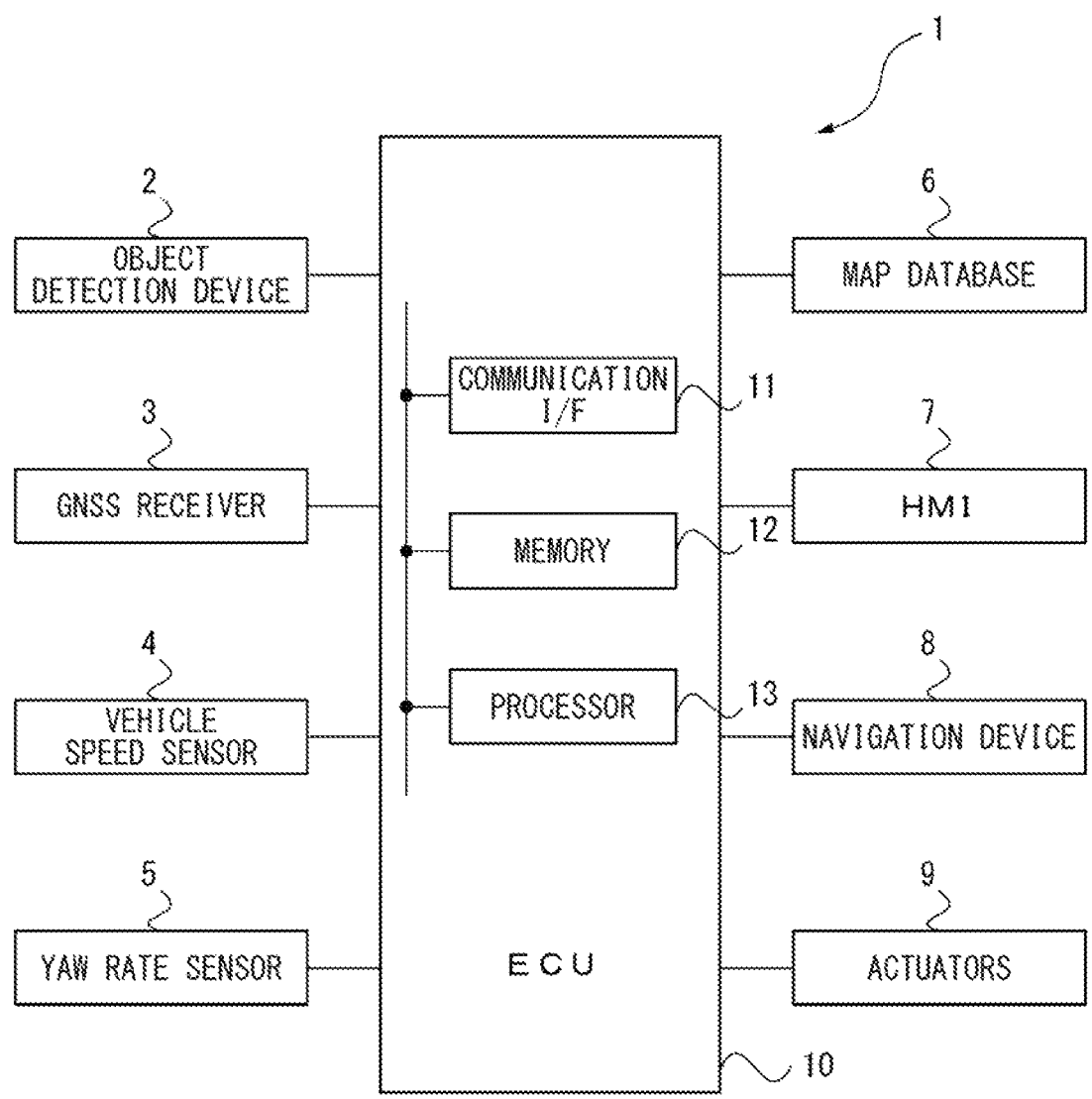
FIG. 1 is a view schematically showing the configuration of an automated driving system provided with a vehicle position estimation device according to a first embodiment of the present disclosure.

Below, referring to the drawings, embodiments of the present disclosure will be explained in detail. Note that in the following explanations, similar component elements will be assigned the same reference notations.

First Embodiment

First, referring to FIG. 1 to FIG. 8, a first embodiment of the present disclosure will be explained.
<Configuration of Automated Driving System>

FIG. 1 is a view schematically showing the configuration of an automated driving system 1 provided with a vehicle position estimation device according to the first embodiment of the present disclosure. The automated driving system 1 is mounted in a vehicle and performs automated driving of the vehicle. In the automated driving of the vehicle, a part or all of the acceleration, steering, and deceleration (braking) of the vehicle is automatically controlled whereby autonomous running of the vehicle is realized.

As shown in FIG. 1, the automated driving system 1 is provided with an object detection device 2, a GNSS receiver 3, a vehicle speed sensor 4, a yaw rate sensor 5, a map database 6, a human machine interface (HMI) 7, a navigation device 8, actuators 9, and an electronic control unit (ECU) 10. The object detection device 2, the GNSS receiver 3, the vehicle speed sensor 4, the yaw rate sensor 5, the map database 6, the HMI 7, the navigation device 8 and the actuators 9 are connected through an internal vehicle network based on the CAN (Controller Area Network) or other standard to be able to communicate with the ECU 10.

The object detection device 2 detects objects (surrounding vehicles, dividing lines, road signs, fallen objects, etc.) present in the surroundings of the vehicle 20 (host vehicle). Specifically, the object detection device 2 detects whether or not there is any object in the surroundings of the vehicle 20, a distance from the vehicle 20 to the object, and a relative speed between the vehicle 20 and the object. The object detection device 2 includes, for example, a camera, a LIDAR (laser imaging detection and ranging), a milliwave radar, an ultrasonic sensor (sonar), etc. The output of the object detection device 2 is sent to the ECU 10.

Figure 2:
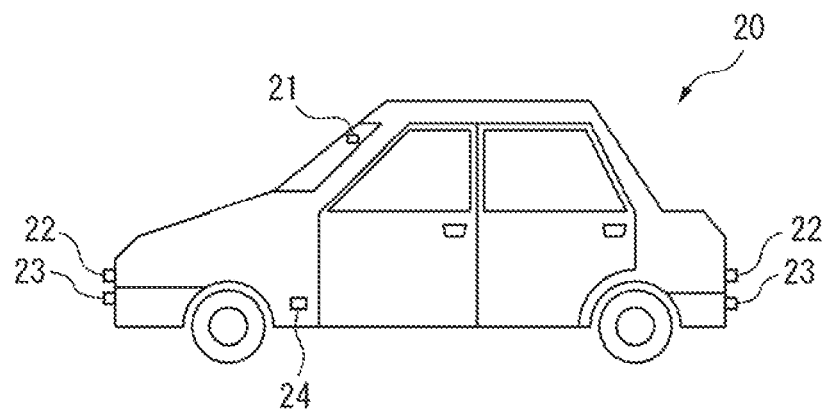
FIG. 2 is a view showing a specific example of an object detection device of FIG. 1.

FIG. 2 is a view showing a specific example of the object detection device 2 of FIG. 1. In the example of FIG. 2, the vehicle 1 is provided with, as the object detection device 2, an external camera 21, a LIDAR 22, a milliwave radar 23, and an ultrasonic sensor (sonar) 24.

The external camera 21 captures the surroundings of the vehicle 20 to generate an image of the surroundings of the vehicle 20. For example, the external camera 21 is placed at the front of the vehicle 20 (for example, the back surface of the room mirror inside the passenger compartment, the front bumper, etc.) so as to capture the area in front of the vehicle 20. Note that, the external camera 21 may be a stereo camera able to detect the distance from the vehicle 20 to the object.

The LIDAR 22 emits laser light at the surroundings of the vehicle 20 and receives the reflections of the laser light. Due to this, the LIDAR 22 can detect whether or not there is any object in the surroundings of the vehicle 20, the distance from the vehicle 20 to the object, and the relative speed of the vehicle 20 and the object. For example, the LIDAR 22 is arranged at the front part and back part of the vehicle 20 (for example, the front bumper and the rear bumper of the vehicle 20).

The milliwave radar 23 emits milliwaves to the surroundings of the vehicle 20 and receives the reflections of the milliwaves. By doing this, the milliwave radar 23 can detect whether or not there is any object in the surroundings of the vehicle 20, the distance from the vehicle 20 to the object, and the relative speed of the vehicle 20 and the object. For example, the milliwave radar 23 is arranged at the front part and back part of the vehicle 20 (for example, the front bumper and the rear bumper of the vehicle 20).

The ultrasonic sensor 24 emits ultrasonic waves to the surroundings of the vehicle 20 and receives reflections of the ultrasonic waves. Due to this, the ultrasonic sensor 24 can detect whether or not there is any object in the surroundings of the vehicle 20, the distance from the vehicle 20 to the object, and the relative speed of the vehicle 20 and the object. For example, the ultrasonic sensor 24 is arranged at the both side parts of the vehicle 20 (for example, the left and right front fenders of the vehicle 20).

Note that, the arrangements and numbers of the external camera 21, the LIDAR 22, the milliwave radar 23, and the ultrasonic sensor 24 are not limited to the above. Further, some of these may be omitted.

The GNSS receiver 3 detects the current position of the vehicle 20 (for example, the latitude and longitude of the vehicle 20) based on positioning information obtained from a plurality of (for example, three or more) satellites. Specifically, the GNSS receiver 3 captures the plurality of satellites and receives signals sent from the satellites. The GNSS receiver 3 calculates the distances to the satellites based on the differences from the times of transmission and times of reception of the signals and detects the current position of the vehicle 20 based on the distances to the satellites and positions of the satellites (orbit information). The output of the GNSS receiver 3 is transmitted to the ECU 10. The GNSS receiver 3 is one example of a vehicle state detection device detecting the status quantity of the vehicle 20 (in this case, the position of the vehicle 20).

Note that, "GNSS" (global navigation satellite system) is the general term for the GPS of the U.S., GLONASS of Russia, Galileo of Europe, QZSS of Japan, BeiDou of China, IRNSS of India, and other satellite position measurement systems. Therefore, the GNSS receiver 3 includes a GPS receiver.

The vehicle speed sensor 4 detects the speed of the vehicle 20. For example, the vehicle speed sensor 4 detects the speed of the vehicle 20 by detecting the rotational speed of the wheels of the vehicle 20. The output of the vehicle speed sensor 4 is sent to the ECU 10. The vehicle speed sensor 4 is one example of a vehicle state detection device detecting the status quantity of the vehicle 20 (in this case, the speed of the vehicle 20).

The yaw rate sensor 5 detects the yaw rate which is the rotational angular speed about a vertical axis passing through a center of gravity of the vehicle 20. For example, as the yaw rate sensor 5, a gyro sensor is used. The output of the yaw rate sensor 5 is sent to the ECU 10. The yaw rate sensor 5 is one example of a vehicle state detection device detecting the status quantity of the vehicle 20 (in this case, the yaw rate of the vehicle 20).

The map database 6 stores 3D map information such as road surface information, lane information, and position information of buildings. The maps stored in the map database 6 are so-called high precision maps. The ECU 10 acquires map information from the map database 6. Note that the map information stored in the map database 6 may be periodically updated using communication with the outside of the vehicle 20, SLAM (simultaneous localization and mapping) technology, etc. Further, the map database 6 may be provided at the server etc., at the outside of the vehicle 20.

The HMI 7 performs input and output of information between the driver and the vehicle 20. The HMI 7, for example, has a display for displaying information, a speaker for generating sound, operating buttons, operating switches, or a touch screen for the driver to operate to input commands, a microphone for receiving voice of the driver, etc. The output of the ECU 10 is transmitted through the HMI 7 to the driver, while the input from the driver is transmitted through the HMI 7 to the ECU 10.

The navigation device 8 sets the driving route of the vehicle 20 to the destination based on the current position of the vehicle 20 detected by the GNSS receiver 3, the map information of the map database 6, input by the driver, etc. The driving route set by the navigation device 8 is transmitted to the ECU 10.

The actuators 9 make the vehicle 201 operate. For example, the actuators 9 include a drive device for acceleration of the vehicle 20 (at least one of an engine and a motor), a brake actuator for braking of the vehicle 20, a steering motor for steering the vehicle 20, etc. The ECU 10 controls the actuators 9 when automated driving of the vehicle 20 is performed.

The ECU 10 performs various types of control of the vehicle. As shown in FIG. 1, the ECU 10 is provided with a communication interface 11, a memory 12, and a processor 13. The communication interface 11 and the memory 12 are connected to the processor 13 through signal lines. Note that, in the present embodiment, a single ECU 10 is provided, but a plurality of ECUs may be provided for the respective functions.

The communication interface 11 has an interface circuit for connecting the ECU 10 to the internal vehicle network. The ECU 10 communicates through the communication interface 11 with other in-vehicle devices as described above.

The memory 12, for example, has a volatile semiconductor memory and a nonvolatile semiconductor memory. The memory 12 stores computer programs, data, etc. used when various processing are performed by the processor 13.

The processor 13 has one or more CPUs (central processing unit) and their peripheral circuits. Note that, the processor 13 may have a processing circuit for numerical operation, a processing circuit for graphic processing, a processing circuit for logical operation, etc.

<Vehicle Position Estimation Device>

Figure 3:
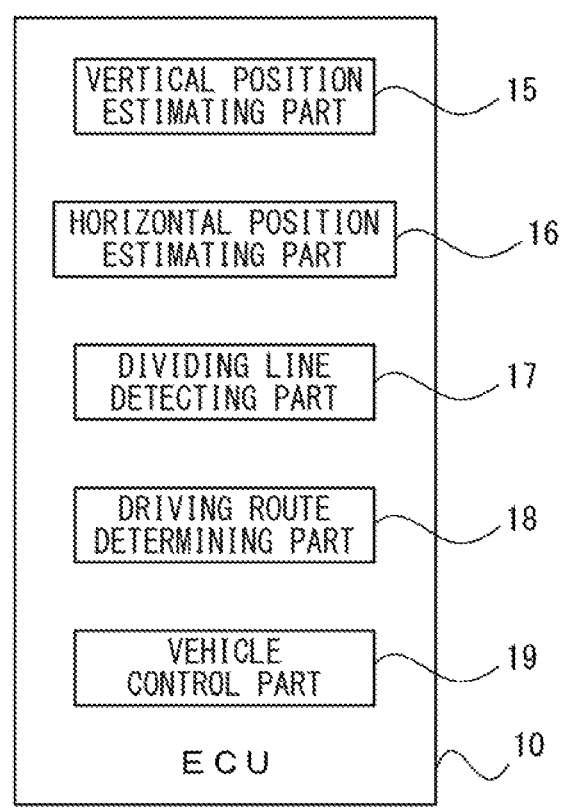
FIG. 3 is a functional block diagram of an ECU of FIG. 1.

In the present embodiment, the ECU 10 functions as a vehicle position estimation device for estimating a home position of the vehicle 20 (host vehicle). FIG. 3 is a functional block diagram of the ECU 10 of FIG. 1. In the present embodiment, the ECU 10 has a vertical position estimating part 15, a horizontal position estimating part 16, a dividing line detecting part 17, a driving route determining part 18, and a vehicle control part 19. The vertical position estimating part 15, the horizontal position estimating part 16, the dividing line detecting part 17, the driving route determining part 18, and the vehicle control part 19 are functional modules realized by the processor 13 of the ECU 10 running a computer program stored in the memory 12 of the ECU 10. Note that, these functional modules may respectively be dedicated processing circuits provided at the processor 13.

The vertical position estimating part 15 estimates the vertical position of the vehicle 20, while the horizontal position estimating part 16 estimates the horizontal position of the vehicle 20. Note that, the "vertical position of the vehicle" means a position of the vehicle (for example, a center or a center of gravity of the vehicle) in the direction of extension of the running lane of the vehicle, while the "horizontal position of the vehicle" means a position of the vehicle (for example, a center or a center of gravity of the vehicle) in the width direction of the running lane of the vehicle.

The dividing line detecting part 17 detects the actual dividing lines at both left and right sides of the vehicle 20. Specifically, the dividing line detecting part 17 detects the actual dividing lines by a known object recognition technique (for example, straight line detection by a Hough transform etc.) based on the output of the object detection device 2 (in particular, external camera 21 or LIDAR 22). A position of an actual dividing line detected by the dividing line detecting part 17 is, for example, shown by XY coordinates in a vehicle coordinate system having the position of the vehicle 20 (for example, a center or a center of gravity of vehicle 20) as the origin.

The driving route determining part 18 determines the driving route of the vehicle 20. Note that, the driving route of the vehicle 20 means a route on a lane over which the vehicle 20 (a center of vehicle 20) passes on a driving route set in advance by the navigation device 8 etc. when automated driving of the vehicle 20 is performed. For example, the driving route determining part 18 determines the driving route of the vehicle 20 so that the vehicle 20 runs through the center of the lane. In this case, the center line of the lane is selected as the driving route of the vehicle 20.

When automated driving of the vehicle 20 is performed, the vehicle control part 19 uses the actuators 9 to control acceleration, steering, and deceleration (braking) of the vehicle 20. For example, the vehicle control part 19 uses the actuators 9 (specifically the steering motor) to control the steering of the vehicle 20 so that the vehicle 20 runs on the driving route determined by the driving route determining part 18.

Below, the method of estimation of the vertical position and the horizontal position of the vehicle 20 will be explained in more detail. The vertical position estimating part 15 estimates the vertical position of the vehicle 20 based on the output of the vehicle state detection device detecting the status quantity of the vehicle 20. For example, the vertical position estimating part 15 estimates the vertical position of the vehicle 20 based on the output of the GNSS receiver 3.

Further, the vertical position estimating part 15 may estimate the vertical position of the vehicle 20 by known dead reckoning based on the outputs of the vehicle speed sensor 4 and the yaw rate sensor 5. In this case, the vertical position estimating part 15 estimates the vertical position of the vehicle 20 by repeatedly calculating the movement distance and the movement direction of the vehicle 20 based on the outputs of the vehicle speed sensor 4 and the yaw rate sensor 5. The vertical position of the vehicle 20 estimated by the vertical position estimating part 15 is shown as, for example, the latitude and longitude or coordinate values in a world coordinate system. By doing this, the vertical position of the vehicle 20 on the map is identified.

On the other hand, the horizontal position estimating part 16 compares a dividing line on the map at the vertical position of the vehicle 20 estimated by the vertical position estimating part 15 and the actual dividing line detected by the dividing line detecting part 17, and estimates the horizontal position of the vehicle 20 based on the relative positional relationship between the actual dividing line and the vehicle 20. Specifically, the horizontal position estimating part 16 acquires the information on a dividing line on the map at the vertical position of the vehicle 20 from the map database 6 and makes the actual dividing line match the dividing line on the map. Further, the horizontal position estimating part 16 estimates the horizontal position of the vehicle 20 on the map based on the position of the vehicle 20 with respect to an actual dividing line arranged on the map so as to match with a dividing line on the map. The horizontal position of the vehicle 20 estimated by the horizontal position estimating part 16 is, for example, shown by the latitude and longitude or coordinate values in a world coordinate system. By doing this, the horizontal position of the vehicle 20 on the map is identified.

However, if estimation error occurs in the vertical position of the vehicle 20, as the dividing line on the map for comparison, a dividing line of a position different from the actual position of the vehicle is used. As a result, the estimation precision of the horizontal position of the vehicle 20 is liable to fall.

Figure 4:
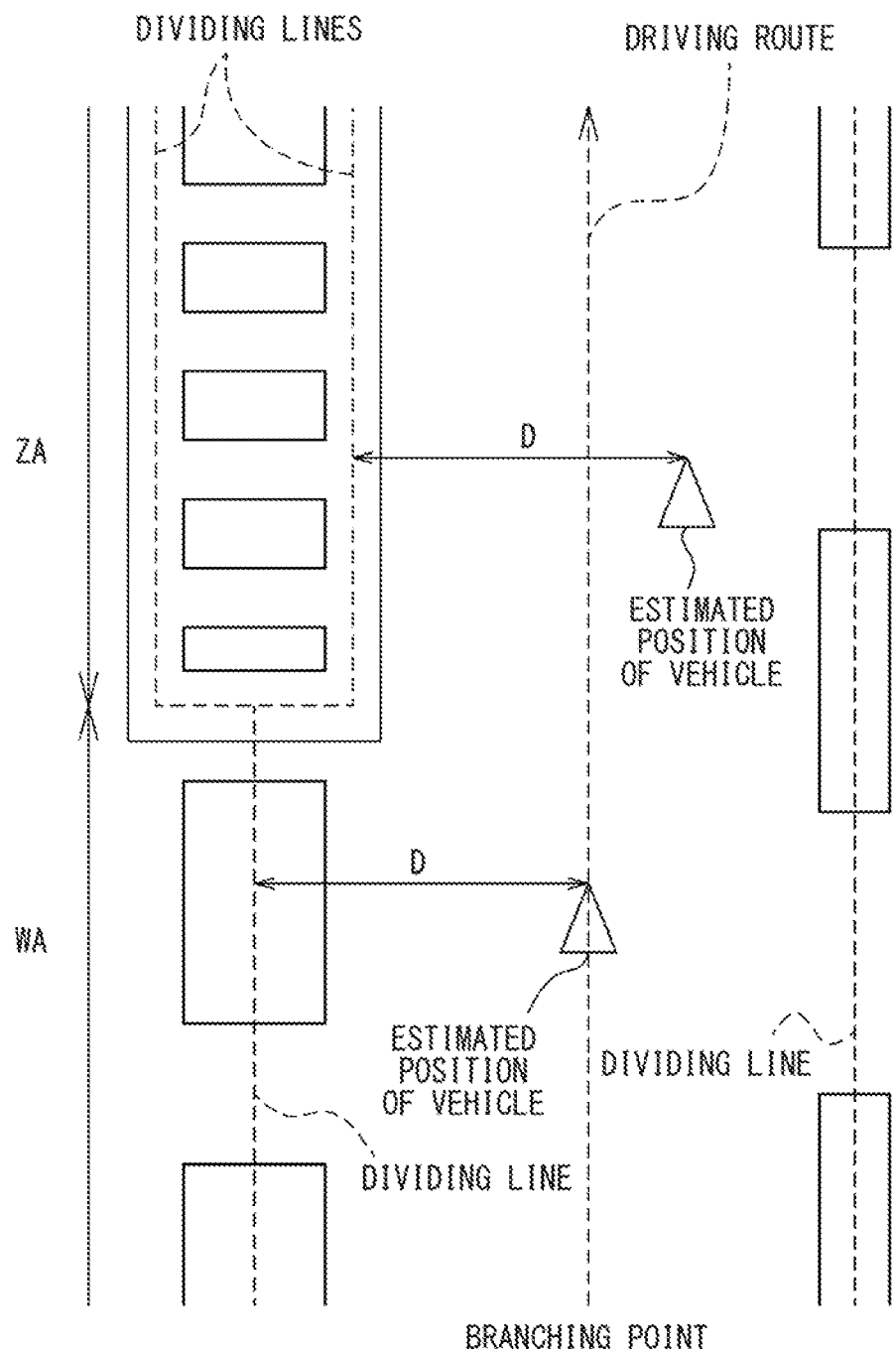
FIG. 4 is a view showing a map of a branching point in a motorway.
Figure 5:
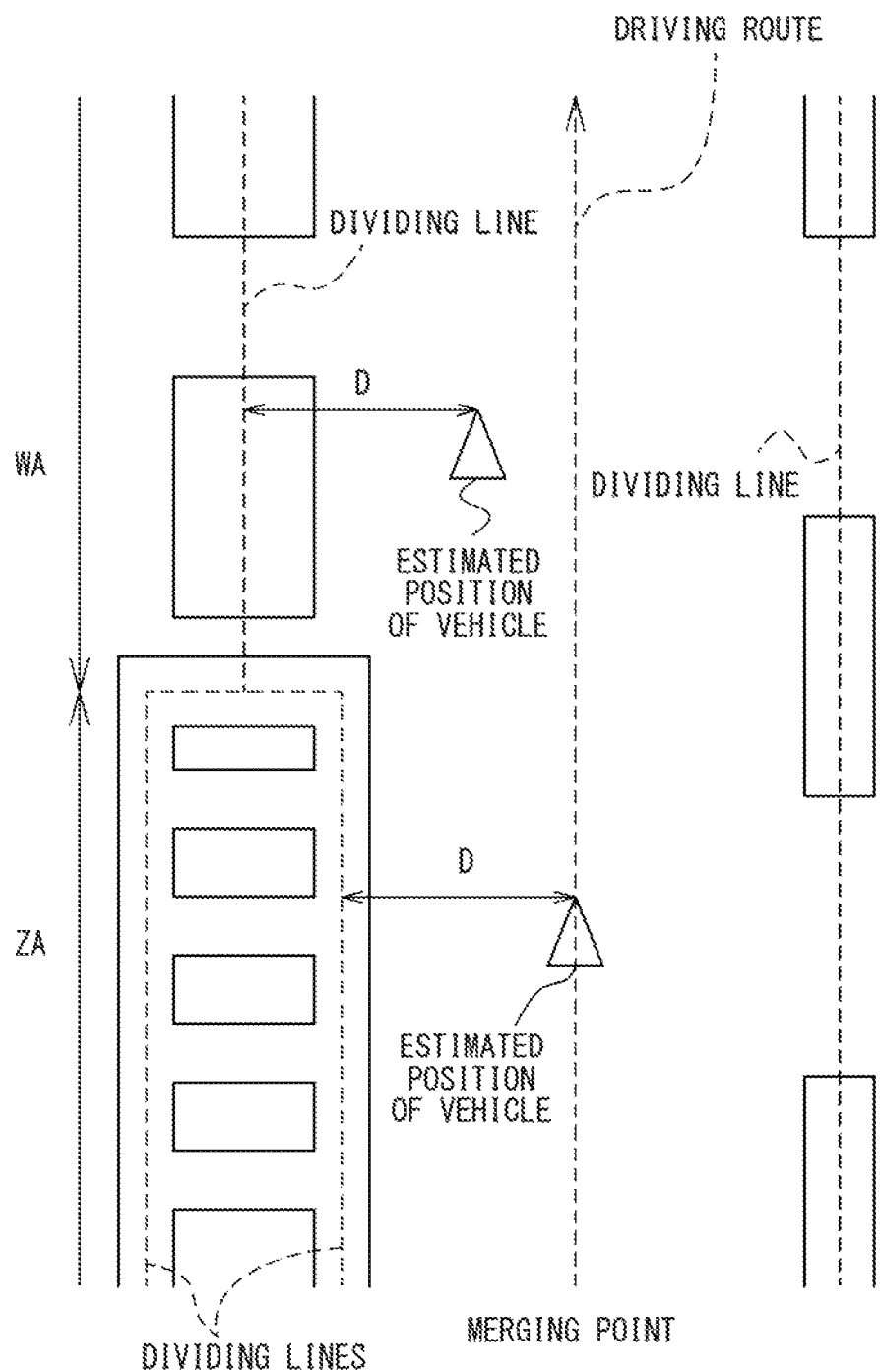
FIG. 5 is a view showing a map of a merging point in a motorway.
Figure 6:
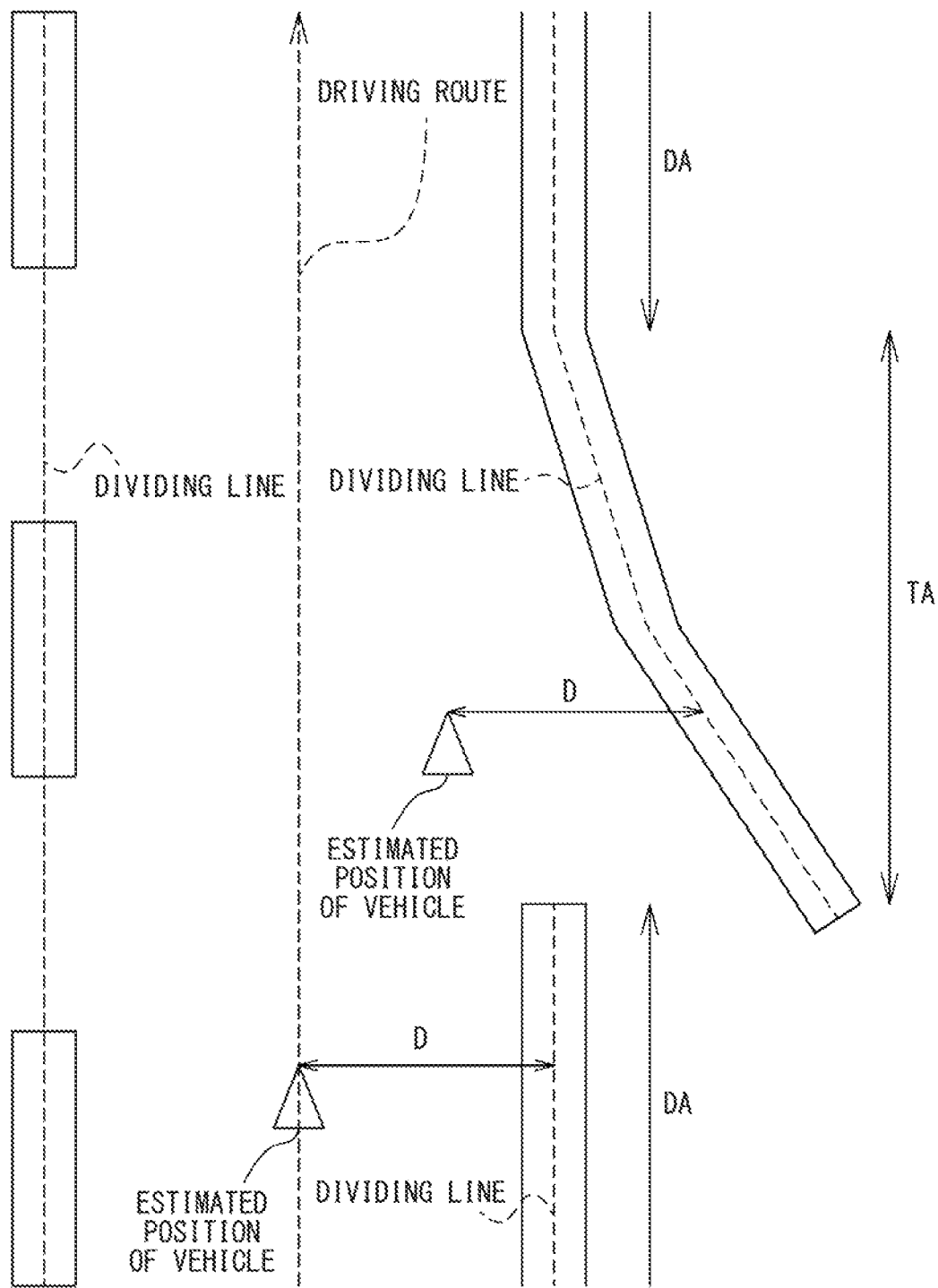
FIG. 6 is a map showing a map of a road having discontinuous dividing lines.

In particular, as shown in FIG. 4 to FIG. 6, if there is a change in the horizontal position of a dividing line on the map with respect to the driving route of the vehicle 20, the effect due to estimation error of the vertical position becomes remarkable. FIG. 4 is a view showing a map of a branching point in a motorway. FIG. 5 is a view showing a map of a merging point in a motorway. FIG. 6 is a map showing a map of a road having discontinuous dividing lines.

At the branching point shown in FIG. 4 and the merging point shown in FIG. 5, as dividing lines, white lines and "zebra zones" (striped crosswalks) are provided. In map information stored in the map database 6, a line connecting the centers of a white line of a predetermined width is registered as a dividing line corresponding to a white line and a line connecting the centers of a white line at a boundary part of the zebra zone is registered as a dividing line corresponding to a zebra zone.

As will be understood from FIG. 4 and FIG. 5, a white line area WA and a zebra zone area ZA differ in the horizontal position of a left side dividing line with respect to the driving route. For this reason, if the distance between the actual dividing line and the vehicle 20 is D, deviation occurs between the horizontal position of the vehicle 20 estimated compared against the left side dividing line of the white line region WA and the horizontal position of the vehicle 20 estimated compared against the left side dividing line of the zebra zone region ZA. Therefore, if the estimated vertical position of the vehicle 20 is in a zebra zone WA and the actual vertical position of the vehicle 20 is in a white line region WA or the reverse, the estimation precision of the horizontal position of the vehicle 20 falls.

Further, in the example of FIG. 6, the direction of extension of the right side white line discontinuously changes. For this reason, a straight line area DA where the white lines extend in the direction of advance of the vehicle 20 and a tilted area TA where the white lines extend in the direction of advance of the vehicle differ in the horizontal position of the right side dividing line with respect to the driving route. For this reason, when the distance between an actual dividing line and the vehicle 20 is D, deviation occurs between the horizontal position of the vehicle 20 estimated compared against the right side dividing line of the straight line area DA and the horizontal position of the vehicle 20 estimated compared against the right side dividing line of the tilted area TA. Therefore, if the estimated vertical position of the vehicle 20 is in a tilted area TA and the actual vertical position of the vehicle 20 is in a straight line area DA or if the reverse, the estimation precision of the horizontal position of the vehicle 20 falls.

On the other hand, in the example of FIG. 4 and FIG. 5, the horizontal position of the right side dividing line with respect to the driving route is constant. For this reason, if estimating the horizontal position of the vehicle 20 compared against the right side dividing line, no deviation occurs in the horizontal position of the vehicle 20 due to estimation error of the vertical position of the vehicle 20. Further, in the example of FIG. 6, the horizontal position of the left side dividing line with respect to the driving route is constant. For this reason, if estimating the horizontal position of the vehicle 20 compared against the left side dividing line, no deviation occurs in the horizontal position of the vehicle 20 due to estimation error of the vertical position of the vehicle 20.

Therefore, in the present embodiment, the horizontal position estimating part 16 calculates the amount of change of the horizontal position with respect to the driving route based on the map information for each of the left and right side dividing lines of the driving route of the vehicle 20 in a predetermined range before and after the vertical position of the vehicle 20 estimated by the vertical position estimating part 15, and determines the dividing line on the map for comparison based on the amount of change of the horizontal position. By doing this, it is possible to keep estimation error of a vertical position of a vehicle 20 from causing a drop in the estimation precision of the horizontal position of a vehicle 20.

For example, the horizontal position estimating part 16 determines the dividing line on the map for comparison by comparing the amount of change of the horizontal position with a threshold value for each of the left and right side dividing lines of the driving route. Specifically, if the amount of change of the horizontal position for the dividing line of one side of the driving route is less than the threshold value and the amount of change of the horizontal position of the dividing line of the other side of the driving route is equal to or greater than the threshold value, the horizontal position estimating part 16 uses the dividing line of the one side on the map for comparison. On the other hand, if the amounts of change of the horizontal position for the dividing lines of the both sides of the driving route are less than the threshold value or the amounts of change of the horizontal position of the dividing lines of the two sides of the driving route are equal to or greater than the threshold value, the horizontal position estimating part 16 uses the dividing lines at the both sides on the map for comparison.

The vehicle control part 19 uses the actuators 9 (specifically the steering motor) to control steering of the vehicle 20 so that the horizontal position of the vehicle 20 estimated by the horizontal position estimating part 16 is positioned on the driving route.

<Processing for Estimation of Horizontal Position>

Figure 7:
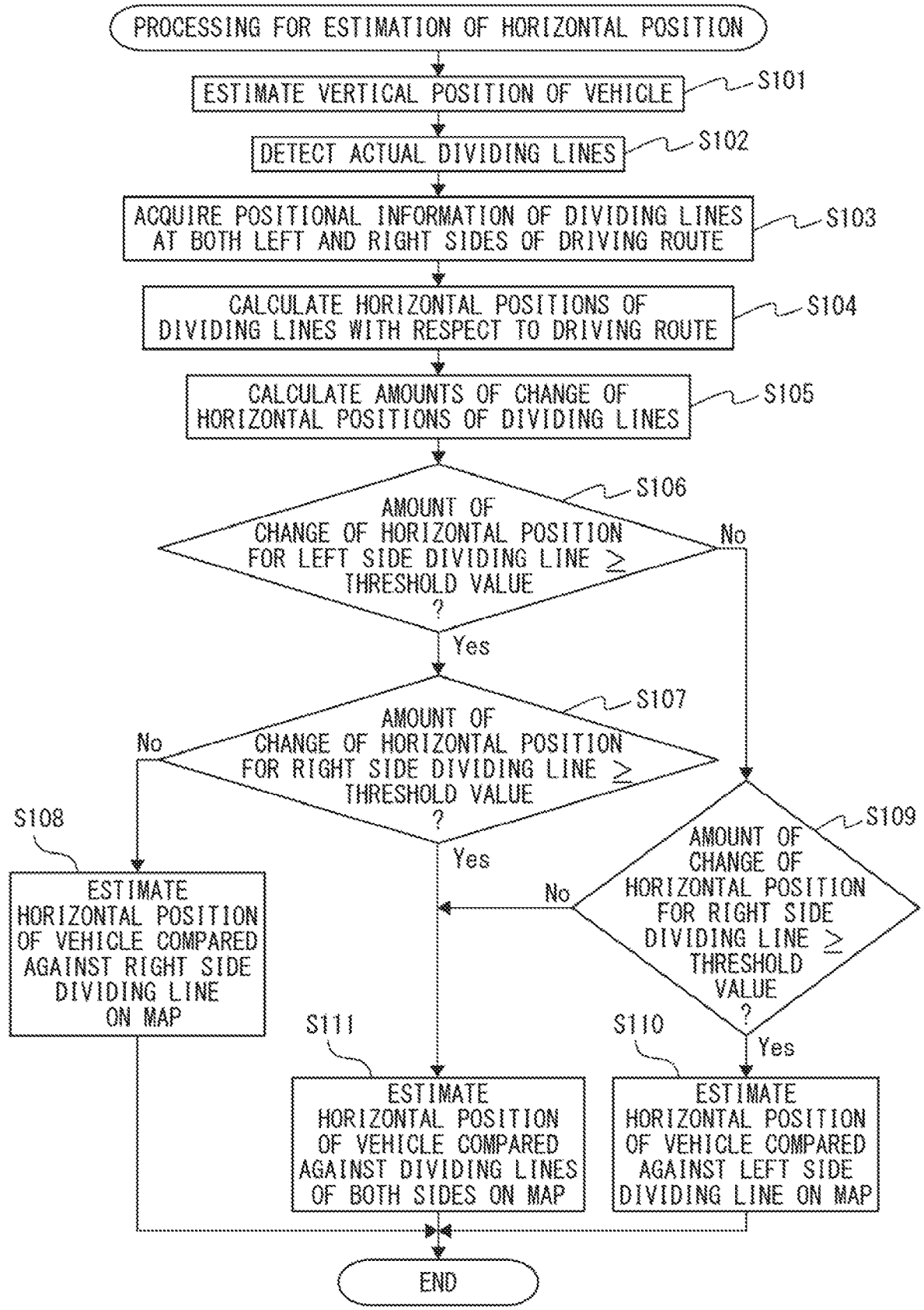
FIG. 7 is a flow chart showing a control routine of processing for estimation of a horizontal position in a first embodiment of the present disclosure.

Below, referring to the flow chart of FIG. 7, the control for estimating the horizontal position of the vehicle 20 will be explained in detail. FIG. 7 is a flow chart showing a control routine of processing for estimation of the horizontal position in the first embodiment of the present disclosure. The present control routine is repeatedly performed by the ECU 10 at predetermined intervals. The predetermined intervals are, for example, intervals at which the output of the object detection device 2 is sent to the ECU 10.

First, at step S101, the vertical position estimating part 15 estimates the vertical position of the vehicle 20 based on the output of the vehicle state detection device detecting the status quantity of the vehicle 20. Next, at step S102, the dividing line detecting part 17 detects the actual dividing lines at the both left and right sides of the vehicle 20 based on the output of the object detection device 2 (in particular, the external camera 21 or LIDAR 22).

Next, at step S103, the horizontal position estimating part 16 acquires position information of the dividing lines at the both left and right sides of the driving route of the vehicle 20 in a predetermined range before and after the vertical position of the vehicle 20 estimated by the vertical position estimating part 15 from the map database 6. The predetermined range is determined in advance considering estimation error of the vertical position of the vehicle 20 etc.

Next, at step S104, the horizontal position estimating part 16 calculates the horizontal position with respect to the driving route for each of the dividing lines at the both left and right sides of the driving route in the above predetermined range. The horizontal position of a dividing line with respect to the driving route is, for example, calculated as the coordinate values of an axis perpendicular to the driving route based on the driving route and position information of the dividing line. At this time, for example, if the dividing line is positioned at the right side of the driving route, the horizontal position of the dividing line is calculated as a positive value, while if the dividing line is positioned at the left side of the driving route, the horizontal position of the dividing line is calculated as a negative value.

FIG. 8 is a view showing one example of the horizontal positions of dividing lines in a predetermined range. In FIG. 8, the horizontal positions of dividing lines are shown in the case where the vertical position of the vehicle 20 at the branching point shown in FIG. 4 is estimated to be a position before a zebra zone. In the example of FIG. 8, before the estimated vertical position of the vehicle 20 (boundary position between white line region WA and zebra zone region ZA), the horizontal position of the left side dividing line greatly changes.

Next, at step S105, the horizontal position estimating part 16 calculates the amount of change of the horizontal position with respect to the driving route for each of the both left and right side dividing lines in the above predetermined range. For example, the horizontal position estimating part 16 divides the above predetermined range into a plurality of sections and calculates the amount of change of the horizontal position in each section. Note that, the horizontal position estimating part 16 may calculate the amount of change of the horizontal position as the difference of the maximum value and minimum value of the horizontal position in the above predetermined range for each of the both left and right side dividing lines.

Next, at step S106, the horizontal position estimating part 16 judges whether the amount of change of the horizontal position for the left side dividing line of the driving route is equal to or greater than a threshold value. The threshold value is set in advance considering the allowable range of the error of the horizontal position etc. Note that, at step S105, if the amount of change of the horizontal position is calculated for each of the plurality of divided sections, the maximum value of the amount of change of the horizontal position is compared with the threshold value.

If at step S106 it is judged that the amount of change of horizontal position for the left side driving line of the driving route is equal to or greater than the threshold value, the present control routine proceeds to step S107. At step S107, the horizontal position estimating part 16 judges whether the amount of change of the horizontal position for the right side dividing line of the driving route is equal to or greater than the threshold value. The threshold value at step S107 is the same as the threshold value at step S106. Note that, in the same way as step S106, if at step S105 the amount of change of the horizontal position is calculated for each of the plurality of divided sections, the maximum value of the amount of change of the horizontal position is compared with the threshold value.

If at step S107 it is judged that the amount of change of the horizontal position for the right side dividing line of the driving route is less than the threshold value, the present control routine proceeds to step S108. At step S108, the horizontal position estimating part 16 estimates the horizontal position of the vehicle 20 compared against a dividing line on the map. That is the horizontal position estimating part 16 compares the right side dividing line on the map and the actual right side dividing line and estimates the horizontal position of the vehicle 20 based on the relative positional relationship between the actual right side dividing line and the vehicle 20. After step S108, the present control routine ends.

On the other hand, if at step S106 it is judged that the amount of change of the horizontal position for the left side dividing line of the driving route is less than the threshold value, the present control routine proceeds to step S109. At step S109, in the same way as step S107, the horizontal position estimating part 16 judges whether the amount of change of the horizontal position for the right side dividing line of the driving route is equal to or greater than the threshold value.

If at step S109 it is judged that the amount of change of the horizontal position for the right side dividing line of the driving route is less than the threshold value, the present control routine proceeds to step S110. At step S110, the horizontal position estimating part 16 estimates the horizontal position of the vehicle 20 compared against the left side dividing line on the map. That is, the horizontal position estimating part 16 compares the left side dividing line on the map and the actual left side dividing line and estimates the horizontal position of the vehicle 20 based on the relative positional relationship between the actual left side dividing line and the vehicle 20. After step S110, the present control routine ends.

Further, if at step S107 it is judged that the amount of change of the horizontal position for the right side dividing line of the driving route is equal to or greater than the threshold value or if at step S109 it is judged that the amount of change of the horizontal position for the right side dividing line of the driving route is less than the threshold value, the present control routine proceeds to step S111. At step S111, the horizontal position estimating part 16 estimates the horizontal position of the vehicle 20 compared against the both side dividing lines on the map. In this case, the horizontal position estimating part 16, in the same way as step S108, uses the right side dividing line to calculate a first horizontal position of the vehicle 20 and, in the same way as step S110, uses the left side dividing line to calculate a second horizontal position of the vehicle 20. Further, the horizontal position estimating part 16 calculates the average position of the first horizontal position and the second horizontal position as the estimated horizontal position of the vehicle 20. After step S111, the present control routine ends.

Second Embodiment

The vehicle estimation device according to the second embodiment is basically similar in configuration and control to the vehicle estimation device according to the first embodiment except for the points explained below. For this reason, below, the second embodiment of the present disclosure will be explained focusing on parts different from the first embodiment.

As explained above, at the points such as shown in FIG. 4 to FIG. 6, the horizontal position of the dividing line with respect to the driving route of the vehicle 20 changes. If such a change of the horizontal position can be detected, it is possible to correct the vertical position of the vehicle 20 using the point of change of the horizontal position as an indicator.

Therefore, in the second embodiment, the vertical position estimating part 15 corrects the vertical position of the vehicle 20 based on the relative positional relationship between the detected point and the vehicle 20 if the point where the horizontal position of the actual dividing line with respect to the driving route of the vehicle 20 changes is detected by the dividing line detecting part 17. By doing this, it is possible to reduce the estimation error of the vertical position of the vehicle 20.

<Processing for Correction of Vertical Position>

Below, referring to the flow chart of FIG. 9, control for correcting the vertical position of the vehicle 20 will be explained in detail. FIG. 9 is a flow chart showing a control routine of processing for correction of the vertical position in the second embodiment of the present disclosure. The present control routine is repeatedly performed by the ECU 10 at predetermined intervals. The predetermined intervals are, for example, intervals at which the output of the object detection device 2 is sent to the ECU 10.

First, at step S201, the vertical position estimating part 15 judges whether a point where the horizontal position of the actual dividing line with respect to the driving route of the vehicle 20 changes (below, referred to as the "point of change of horizontal position") has been detected by the dividing line detecting part 17. As an example of the point of change of horizontal position, there are a boundary between a white line and zebra zone (FIG. 4 and FIG. 5), a point where the direction of extension of the white line changes discontinuously (FIG. 6), etc. The dividing line detecting part 17 detects a point of change of horizontal position based on the output of the object detection device 2 (in particular, external camera 21 or LIDAR 22).

If at step S201 it is judged that a point of change of horizontal position has not been detected, the present control routine ends. On the other hand, if at step S201 it is judged that a point of change of horizontal position has been detected, the present control routine proceeds to step S202.

At step S202, the vertical position estimating part 15 corrects the vertical position of the vehicle 20 based on the relative positional relationship between the point of change of horizontal position detected by the dividing line detecting part 17 and the vehicle 20. Specifically, the vertical position estimating part 15 identifies the position on the map of the point of change of horizontal position detected by the dividing line detecting part 17 based on the vertical position of the vehicle 20 estimated based on the output of the vehicle state detection device. Further, the vertical position estimating part 15 corrects the vertical position of the vehicle 20 estimated based on the output of the vehicle state detection device to the position on the map of the point of change of horizontal position. After step S202, the present control routine ends.

Above, preferred embodiments according to the present disclosure were explained, but the present disclosure is not limited to these embodiments. Various corrections and changes can be made within the language of the claims.

For example, the horizontal position estimating part 16 may calculate the initial value of the horizontal position of the vehicle 20 based on the output of the vehicle state detection device and correct the initial value to estimate the horizontal position of the vehicle 20. In this case, the horizontal position estimating part 16 compares the dividing lines on the map and the actual dividing lines, and corrects the initial value of the horizontal position based on the relative positional relationship between the actual dividing lines and the vehicle 20 to estimate the horizontal position of the vehicle 20. Further, in this case, if the amounts of change of the horizontal position for the dividing lines of both sides of the driving route are equal to or greater than the threshold value (if judgment at step S107 of FIG. 7 is positive), the initial value of the horizontal position may be used as the estimated position of the horizontal position of the vehicle 20.

Further, if the amount of change of the horizontal position for the dividing line of one side of the driving route is smaller than the amount of change of the horizontal position for the dividing line of the other side of the driving route, the horizontal position estimating part 16 may use the dividing line of the above one side for comparison. Further, if the difference between the amount of change of the horizontal position of the dividing line of one side of the driving route and the amount of change of the horizontal position of the dividing line of the other side of the driving route is equal to or greater than a predetermined value, the horizontal position estimating part 16 may use the dividing line of the smaller amount of change for comparison.

Further, a computer program for causing a computer to realize the functions of the different parts of the processor of the vehicle position estimation device according to the above embodiments may be provided in a form stored in a recording medium able to be read by a computer. A recording medium able to be read by a computer is, for example, a magnetic recording medium, an optical recording medium, or a semiconductor memory.

REFERENCE SIGNS LIST 10 electronic control unit (ECU)
15 vertical position estimating part
16 horizontal position estimating part
17 dividing line detecting part
18 driving route determining part
19 vehicle control part
20 vehicle

The invention claimed is:

1. A vehicle position estimation device comprising a processor configured to:
   estimate a vertical position of a vehicle based on an output of a vehicle state detection device detecting a status quantity of the vehicle;
   detect actual dividing lines at both left and right sides of the vehicle;
   compare a dividing line on a map at the vertical position of the vehicle and an actual dividing line and estimate a horizontal position of the vehicle based on a relative positional relationship between the actual dividing line and the vehicle; and
   determine a driving route of the vehicle, wherein
   the processor is configured to calculate an amount of change of a horizontal position with respect to the driving route for each of dividing lines of both left and right sides of the driving route in a predetermined range before and after the vertical position of the vehicle based on a map information, and determine a dividing line on the map for comparison based on the amounts of change.

2. The vehicle position estimation device according to claim 1, wherein if the amount of change for the dividing line of one side of the driving route is less than a predetermined threshold value and the amount of change for the dividing line of the other side of the driving route is equal to or greater than that threshold value, the processor is configured to use the dividing line at the one side on the map for comparison.

3. The vehicle position estimation device according to claim 1, wherein if a point where the horizontal position of the actual dividing line with respect to the driving route changes is detected, the processor is configured to correct the vertical position of the vehicle based on a relative positional relationship between the point and the vehicle.

4. A vehicle position estimation method including:
   estimating a vertical position of a vehicle based on an output of a vehicle state detection device detecting a status quantity of the vehicle;
   detecting actual dividing lines at both left and right sides of the vehicle;
   comparing a dividing line on a map at the vertical position of the vehicle and an actual dividing line and estimating a horizontal position of the vehicle based on a relative positional relationship between the actual dividing line and the vehicle; and
   determining a driving route of the vehicle, wherein
   estimating the horizontal position of the vehicle includes calculating an amount of change of a horizontal position with respect to the driving route for each of dividing lines of both left and right sides of the driving route in a predetermined range before and after the vertical position of the vehicle based on a map information, and determining a dividing line on the map for comparison based on the amounts of change.

5. A non-transitory recording medium having recorded thereon a computer program causing a computer to:
   estimate a vertical position of a vehicle based on an output of a vehicle state detection device detecting a status quantity of the vehicle;
   detect actual dividing lines at both left and right sides of the vehicle;
   compare a dividing line on a map at the vertical position of the vehicle and an actual dividing line and estimate a horizontal position of the vehicle based on a relative positional relationship between the actual dividing line and the vehicle; and
   determine a driving route of the vehicle, wherein
   estimating the horizontal position of the vehicle includes calculating an amount of change of a horizontal position with respect to the driving route for each of dividing lines of both left and right sides of the driving route in a predetermined range before and after the vertical position of the vehicle based on a map information, and determining a dividing line on the map for comparison based on the amounts of change.

* * * * *